(12) United States Patent
Reznik et al.

(10) Patent No.: US 8,005,782 B2
(45) Date of Patent: Aug. 23, 2011

(54) DOMAIN NAME STATISTICAL CLASSIFICATION USING CHARACTER-BASED N-GRAMS

(75) Inventors: Ilia Reznik, Bay Shore, NY (US); Roger N. Simonson, St. James, NY (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 11/837,476

(22) Filed: Aug. 10, 2007

(65) Prior Publication Data
US 2009/0043720 A1    Feb. 12, 2009

(51) Int. Cl.
*G06N 7/02* (2006.01)
*G06F 9/44* (2006.01)
*G06N 7/06* (2006.01)

(52) U.S. Cl. .......................................................... 706/52
(58) Field of Classification Search ...................... 706/20
See application file for complete search history.

(56) References Cited

U.S. PATENT DOCUMENTS

| | | | |
|---|---|---|---|
| 5,452,442 A * | 9/1995 | Kephart | 714/38 |
| 6,131,082 A | 10/2000 | Hargrave et al. | |
| 6,266,664 B1 | 7/2001 | Russell-Falla et al. | |
| 6,560,596 B1 | 5/2003 | Margulies et al. | |
| 6,578,032 B1 | 6/2003 | Chandrasekar et al. | |
| 6,826,576 B2 | 11/2004 | Lulich et al. | |
| 6,947,918 B2 | 9/2005 | Brill | |
| 7,133,860 B2 | 11/2006 | Iizuka et al. | |
| 2002/0035611 A1 | 3/2002 | Dooley | |
| 2003/0233232 A1 | 12/2003 | Fosler-Lussier et al. | |
| 2004/0162895 A1 | 8/2004 | Mok et al. | |
| 2004/0167982 A1 | 8/2004 | Cohen et al. | |
| 2005/0234953 A1 | 10/2005 | Zhang et al. | |
| 2005/0289168 A1 | 12/2005 | Green et al. | |
| 2006/0059337 A1 | 3/2006 | Poyhonen et al. | |
| 2006/0089924 A1 | 4/2006 | Raskutti et al. | |
| 2006/0095404 A1 | 5/2006 | Adelman et al. | |

(Continued)

FOREIGN PATENT DOCUMENTS

JP    08-221447 A    8/1996

(Continued)

OTHER PUBLICATIONS

Zhang, et al. "The Role of URLs in Objectionable Web Content Categorization", Proc. 2006 IEEE/WIC/ACM International Conference on Web Intelligence, pp. 1-7.*

(Continued)

*Primary Examiner* — Omar F Fernandez Rivas
*Assistant Examiner* — Li-Wu Chang

(57) ABSTRACT

Systems and methods of classifying domain names are disclosed. Character-based n-grams are derived from a domain name in order to classify such domain name in one or more categories. In one aspect, a geometrical approach is used. Domain name character-based n-grams are mapped to vector points in a multidimensional space. The relationship between a domain name vector point and vector points of other domain names is used as an indicator of the classification of the domain name vector point. In another aspect, a statistical approach is used. Relative frequencies of one or more character-based n-grams in various classifications are used as indicators. Each character-based n-gram can be associated with a respective probability that indicates a likelihood that the character-based n-gram is found in a domain name of a given classification. Such a probability can serve as an estimator of a classification of a new domain name having such character-based n-gram.

18 Claims, 10 Drawing Sheets

U.S. PATENT DOCUMENTS

| | | | |
|---|---|---|---|
| 2006/0106866 A1 | 5/2006 | Green et al. |
| 2006/0112040 A1 | 5/2006 | Oda |
| 2006/0149710 A1 | 7/2006 | Koningstein et al. |
| 2006/0212142 A1 | 9/2006 | Madani et al. |
| 2006/0212413 A1 | 9/2006 | Rujan et al. |
| 2006/0229899 A1 | 10/2006 | Hyder et al. |
| 2006/0287988 A1 | 12/2006 | Mason |
| 2007/0022419 A1 | 1/2007 | Subbarao et al. |
| 2007/0094500 A1 | 4/2007 | Shannon et al. |
| 2009/0043721 A1 | 2/2009 | Reznik et al. |

FOREIGN PATENT DOCUMENTS

| | | |
|---|---|---|
| JP | 2000-231559 A | 8/2000 |
| KR | 10-2002-0011671 A | 2/2002 |

OTHER PUBLICATIONS

Paul N. Bennett et al. "Detecting Action-Items in E-mail", Proceedings of the 28th annual international ACM SIGIR conference on Research and development in information retrieval, 2005.

Min-Yen Kan et al. "Fast webpage classification using URL features", Proceedings of the 14th ACM international conference on Information and knowledge management, 2005.

Xiaogang Peng et al. "Automatic Web Page Classification in a Dynamic and Hierarchical Way", IEEE International Conference on Data Mining, 2002, pp. 386-393.

Helmut Berger et al. "On the Impact of Document Representation on Classifier Performance in e-Mail Categorization", 2005.

International Search Report for PCT/US2008/072668 mailed Aug. 8, 2008. 10 Pages.

International Search Report and Written Opinion for PCT/US2008/072666 mailed Jan. 21, 2009, 13 pages.

Zhang, et al. "The Role of URLs in Objectionable Web Content Categorization", Proc. 2006 IEEE/WIC/ACM International Conference on Web Intelligence, pp. 1-7.

Kanaris, et al. "Spam Detection Using Character N-Grams", SETN 2006, LNAI 3955, 2006, pp. 95-104.

International Preliminary Report on Patentability for PCT/US2008/072668 mailed Feb. 25, 2010, 6 pages.

Asirvatham, et al., "Web Page Classification based on Document Structure", retrieved from <http://www.iiit.net/ students/stud_pdfs/kranthi1.pdf> on Aug. 21, 2007, 10 pages.

Zhang, et al., "The Role of URLs in Objectionable Web Content Categorization", retrieved from <http://ieeexplore.ieee.org/ie15/4061321/4061322/04061377.pdf?isNumber=&htry=7> on Aug. 21, 2007, 7 pages.

Kan, et al., "Fast Webpage Classification using URL Features", retrieved from <http://wing.comp.nus.edu.sg/meurlin/ nustrc8_05.pdf> on Aug. 21, 2007, 9 pages.

\* cited by examiner

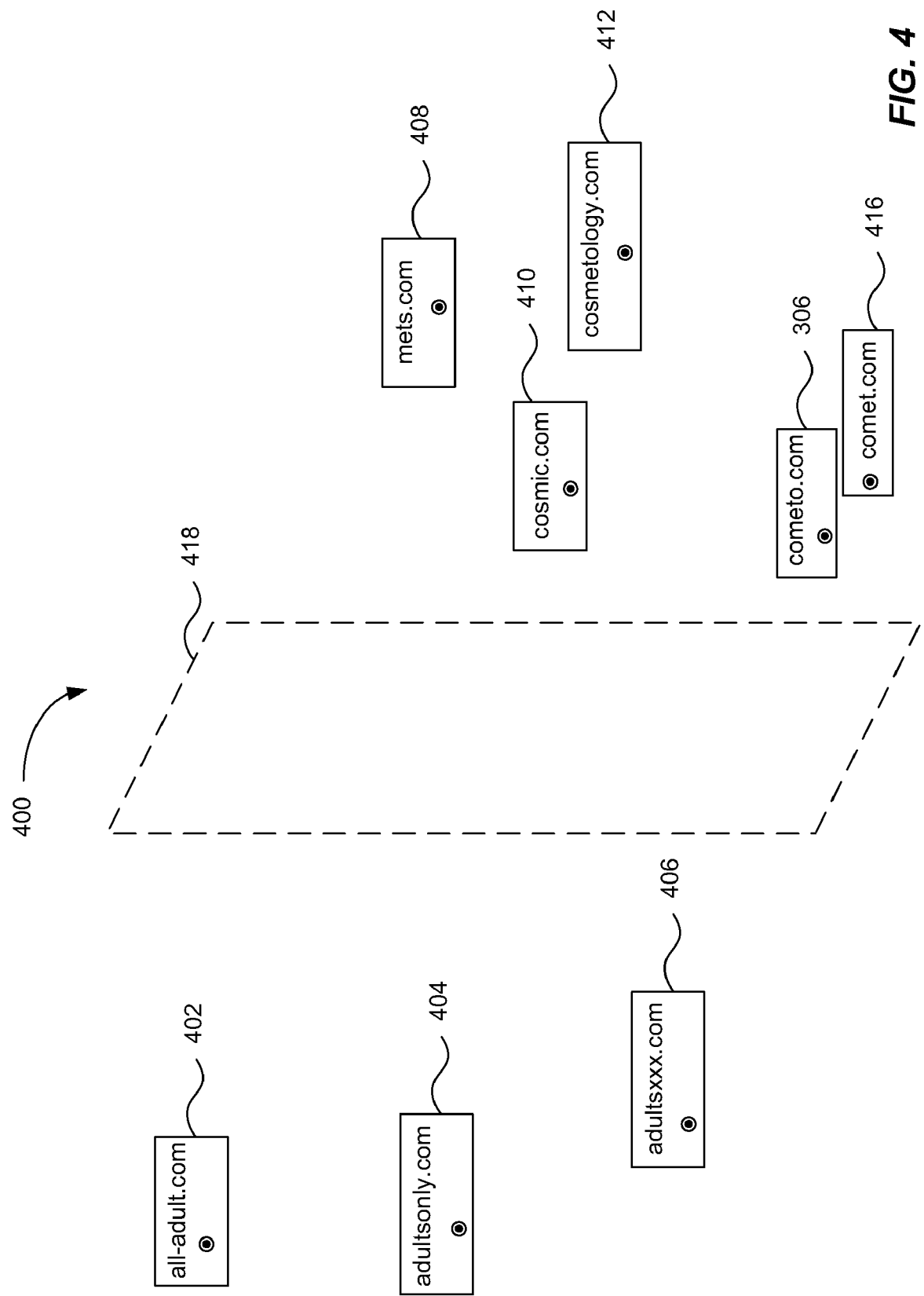

| 3-gram | First Classification | Second Classification | Third Classification |
|---|---|---|---|
| adu | 21/400 | 10/700 | 85/500 |
| dul | 13/400 | 15/700 | 0/500 |
| ult | 50/400 | 30/700 | 3/500 |
| xxx | 18/400 | 650/700 | 3/500 |
| ... | ... | ... | ... |
| to. | 165/400 | 220/700 | 79/500 |
| com | 340/400 | 580/700 | 359/500 |

FIG. 6A

| 3-gram | First Classification | Second Classification | Third Classification |
|---|---|---|---|
| adu | 0.0525 | 0.0143 | 0.17 |
| dul | 0.0325 | 0.0214 | 0 |
| ult | 0.125 | 0.043 | 0.006 |
| xxx | 0.045 | 0.923 | 0.006 |
| ... | ... | ... | ... |
| to. | 0.4125 | 0.314 | 0.158 |
| com | 0.85 | 0.828 | 0.718 |

| 3-gram | First Classification | Second Classification | Third Classification |
|---|---|---|---|
| adu | 22.17% | 6.03% | 71.79% |
| dul | 60.3% | 39.7% | 0% |
| ult | 71.84% | 24.71% | 3.44% |
| xxx | 4.62% | 94.76% | 0.6% |
| ... | | | |
| to. | 46.63% | 35.50% | 17.86% |
| com | 35.47% | 34.55% | 29.96% |

700
614
616
618
620
622
624

DOMAIN NAME STATISTICAL CLASSIFICATION USING CHARACTER-BASED N-GRAMS

BACKGROUND

Large numbers of web content data and web sites are added to the Internet every day. As users become more selective about the content that they access, Internet security, rapid proliferation of malicious Internet sites, and the relatively short lifetime of many of web pages, continue to present challenges to a pleasant user experience. Website classification has been used to filter undesired websites, or at least present the user with a notification of the classification of a particular website that the user is about to access.

Website classification continues to be challenging. Limited or non-existent data provided within websites encumbers the use of programmatic classification methods that rely on the web content data in order to classify the web site. Furthermore, websites with large numbers of web content data require processing time beyond acceptable levels.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one aspect, the classification systems and methods disclosed herein utilize character-based n-grams derived from a domain name in order to classify such domain name in one or more pre-established categories. In order to do so, the classification systems and methods can use a geometrical approach. Character-based n-grams derived from the domain name are mapped to vector points in a multidimensional space. In addition, vector points for various other domain names, which belong to a domain name classification, can be mapped in a multidimensional space. The number of dimensions in the multidimensional space is the number of different n-grams that can exist for an n-character combination. The relationship between the domain name vector point and the vector points of the various other domain names is used as an indicator of the classification of the domain name vector point.

In another aspect, the classification system can be configured to utilize statistical methods, and approach the classification of the domain name by using the relative frequencies of one or more character-based n-grams in various classifications. In one example, a dictionary set of character-based n-grams can be derived from one or more domain names. The character-based n-grams in the dictionary set can be associated with probability indicative to the likelihood that the character-based n-gram is found in a domain name of a given classification. Such probability can serve as an estimator of a classification of a new domain name having such character-based n-gram.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 illustrates a multidimensional space having various vector points for various domain names according to one embodiment.

FIG. 6A illustrates an exemplary table of character-based n-gram in one or more classifications according to one embodiment.

FIG. 6B illustrates an exemplary table of occurrences for character-based n-grams of FIG. 6A according to one embodiment.

FIG. 7 illustrates an exemplary table of relative frequencies of character-based n-grams according to one embodiment.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The method and system disclosed herein permit the classification of websites according to n-grams derived from the domain name of a website. Most websites are referenced by a universal resource identifier (URI) and the vast majority uses a domain name. Therefore, the use of character-based n-gram methods with domain names avoids having to use the website content to classify the website. Further, the processing time to analyze a domain name in comparison with the website content results in significantly improved processing times.

Domain names are generally created to reflect the content or purpose of website. As such, domain names can be used to classify a web site referenced by that domain name. Character-based n-grams facilitate rapid machine learning in relation to typical programmatic classification methods. A character-based n-gram is a sub-sequence of n items from a given sequence. The items in question can be letters, words or base pairs according to the application. As used herein, character-based n-grams are derived based on the characters of a domain name. Currently, domain names have 38 possible symbols. That is ten for the numeric symbols 0-9, twenty-six for the alphabetic symbols a-z, one for the dash symbol, and one for the dot symbol.

Figure 1:
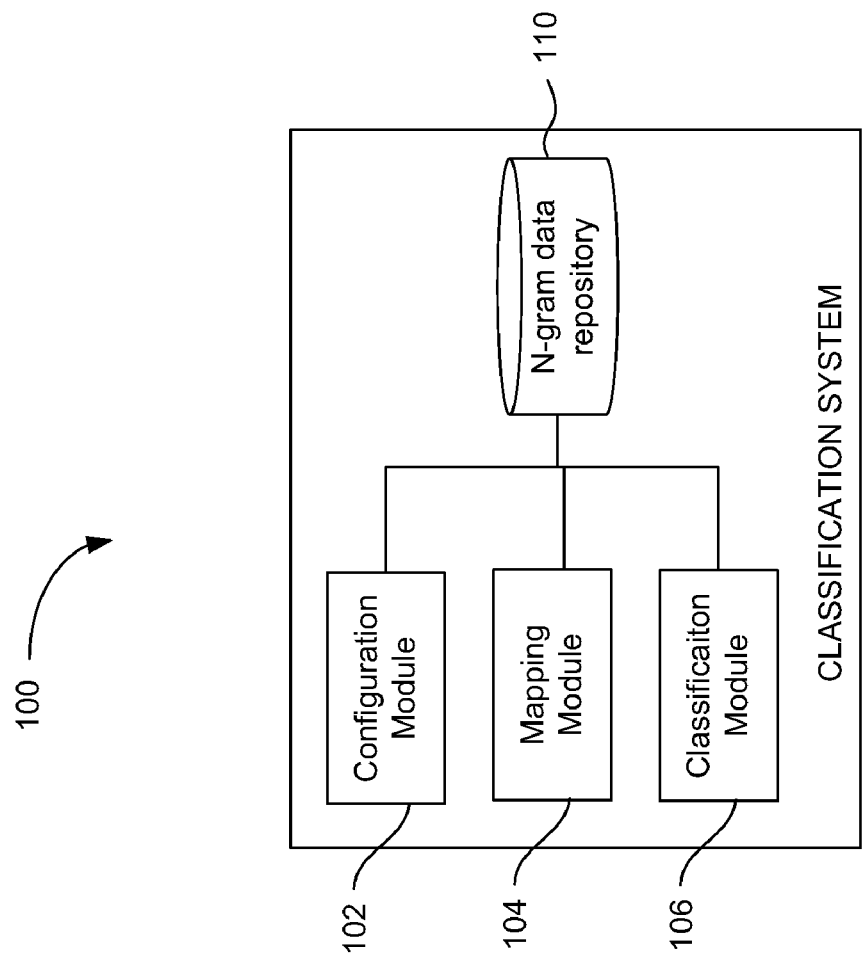
FIG. 1 illustrates a component diagram of a system for classifying a domain name according to one embodiment.

FIG. 1 illustrates a component diagram of a system for classifying a domain name according to one embodiment. One or more software modules can be included in order to permit the classification system 100 to receive domain names and accurately classify the received domain name in real time. The classification system 100 can include a configuration module 102, a mapping module 104 and a classification module 106. Furthermore, the classification system 100 can be configured to store one or more character-based n-grams in a character-based n-gram data repository 110.

As stated above, the classification system 100 can be configured to utilize numerical data derived from the character-based n-grams of a domain name in order to classify the domain name in one or more classifications via various methodologies. In one example, the numerical data is analyzed using a vector analysis approach in which character-based n-grams of a domain name define a vector point of the domain name in a multidimensional space. In another example, the numerical data is analyzed using statistical methods to determine the probability of a domain name, or of a character-based n-gram in the domain name, of being in a given classification. Various other methods can be implemented to utilize such numerical data.

In one embodiment, the configuration module 102 can be configured to establish a plurality of vector points in a multidimensional space. The plurality of vector points in the multidimensional space can correspond to a plurality of domain names. As such, multiple domain names can be mapped to the multidimensional space. As will be discussed below, a domain name can be mapped to the multidimensional based on its character-based n-grams. Furthermore, the configuration module 102 can also be configured to assign one or more domain names of the plurality of domain names to be part of a domain name classification. As such, the configuration module 102 can be configured to permit a user to manually establish a set of domain names to be part of a classification. In another example, the configuration module can automatically arrange the domain names to be part of such classification. For instance, the configuration module 102 can establish that a hundred domain names having mapped vector points in the same section of a multidimensional space correspond to the same classification. Of course, various methods can be utilized in order to group one or more domain names and their corresponding vector points in the multidimensional space to be part of a specific domain name classification.

In another embodiment, the configuration module 102 can be configured to identify a dictionary set of character-based n-grams. The dictionary set can include a plurality of character-based n-grams each associated with a probability. Such probability can be indicative of the chances that a domain name containing a given character-based n-gram is in a given classification. In other words, each character-based n-gram in the dictionary set can have a probability value for each classification such that if a domain name includes a given n-gram in the dictionary set, the likelihood that the domain name includes web content that is classified under a given classification is can be quantified as being the probability value. For example if the classification system 100 establishes that there are two domain name classifications, the character-based n-grams in the dictionary set can be associated with a first classification probability value and a second classification probability value. The first classification probability value can be for example indicative of whether the corresponding character-based n-gram is likely to be in a first domain name classification. Likewise the second classification probability value can be indicative of whether the corresponding character-based n-gram is likely to be in a second domain name classification. In one aspect, the dictionary set of character-based n-grams can be stored in a character-based n-gram data repository 110. In one aspect, the dictionary set can be stored in the n-gram data repository 110.

In another embodiment, the classification system 100 can include a mapping module 104 that permits to identify a set of character-based n-grams that correspond to a domain name string which in turn corresponds to a domain name. In other words, the mapping module 104 can be configured to derive character-based n-grams from a domain name string. The derived n-gram can be a two-gram, three-gram, a four-gram, or any other n-gram with any value of n. The mapping module 104 can further be configured to map each character-based n-gram a vector point in multidimensional space wherein each dimension in the multidimensional space corresponds to each character-based n-gram in the set of character-based n-grams. Thus, once a domain name is received from a user or identified for classification, the domain name can be broken into character-based n-grams and each character-based n-gram can represent a dimension in the multidimensional space. Using this approach any domain name can be plotted to a specific location or vector point in a multidimensional space based upon its character-based n-grams.

In another embodiment, the mapping module 104 can be utilized by the classification system 100 to classify the domain name using a statistical analysis approach. In order to do so, the mapping module 104 can be configured to map each of the character-based n-grams in the domain name to character-based n-grams in a dictionary set. Therefore the mapping module 104 can be configured with logic that compares, character by character, character-based n-grams in the dictionary set against the character-based n-grams derived from the domain name. Various comparing algorithms can be utilized by the mapping module 104 in order to determine and establish the character-based n-grams that are equivalent in the dictionary set to the character-based n-grams of the domain name.

The classification system 100 can also include a classification module 106 that is configured to classify the domain name based upon the derived character-based n-grams of the domain name. In one embodiment, the classification module 106 can be configured to determine the classification of the domain name based on a multidimensional space that includes a plurality of domain name vector points. Such domain names previously stored in the character-based n-gram data repository 110 can be either directly retrieved by the classification module 106, or by interacting with the mapping module 104. The classification module 106 can be configured to determine the correlation between the domain name vector points and the vector point corresponding to the domain name. As such, the classification module 106 can compare the domain name vector points in the multidimensional space with a plurality of vector points located in the multidimensional space wherein the plurality of vector points correspond to a plurality of domain names.

In addition, the classification module 106 can be configured to determine whether the domain name is correlated to the classification of the plurality of domain names based upon a distance analysis that takes into account the distance between the domain name vector point and each of the vector points in the plurality of domain name vector points. Of course, various methods can be utilized to determine the distance between the domain name vector point and the various domain name vector points in the multidimensional space. The plurality of domain name vector points can represent a domain name classification such if the domain name vector point is determined to be correlated with the plurality of the domain name vector points it can be established that the domain name corresponding to the domain name point is classified under such domain name classification.

The classification module 106 can be configured with logic to compare distances between a domain name vector point and various vector points in the plurality of the domain name vector points. Furthermore, the classification model 106 can be configured to detect the vector point location with respect to a margin in the multidimensional space, such as parallel hyperplanes.

In one example, a vector point is identified to be in a classification according to a threshold distance of the vector point to the hyperplane. In another example, a requirement that at least two vector points of a specific classification be in proximity of the domain name vector point can be established to determine the classification of a domain name. Therefore, as long as the domain name vector point is in proximity to two vector points in the set of domain name vector points then it can be determined that the domain name falls under the domain name classification of the two domain name vector points.

In another embodiment, the classification module 106 can be configured to determine the classification of the domain name based on whether one or more character-based n-grams in such domain name are correlated or have a specific probability value for being in a specific classification. The classification module 106 can query the probability values of one or more character-based n-grams as stored in the dictionary set of the n-gram data repository 110. Once the probability value of each character-based n-gram of the domain name is determined, the likelihood that the domain name can be established to be in a classification can be established based on the probability of its n-grams being in such classification. In one example, the domain name can be classified based upon a selected character-based n-gram of the domain name string. The domain name can be classified in a first domain name classification if a first classification probability value of the character-based n-gram in the dictionary set similar to a character-based n-gram in the domain name set is higher than a specific threshold. The domain name can be classified in a second domain name classification if a second classification probability value of the character-based n-gram in the dictionary set similar to a character-based n-gram in the domain name set is higher than a specific threshold. These and other examples are further illustrated below.

One skilled in the art will recognize that the n-gram data repository 110 can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
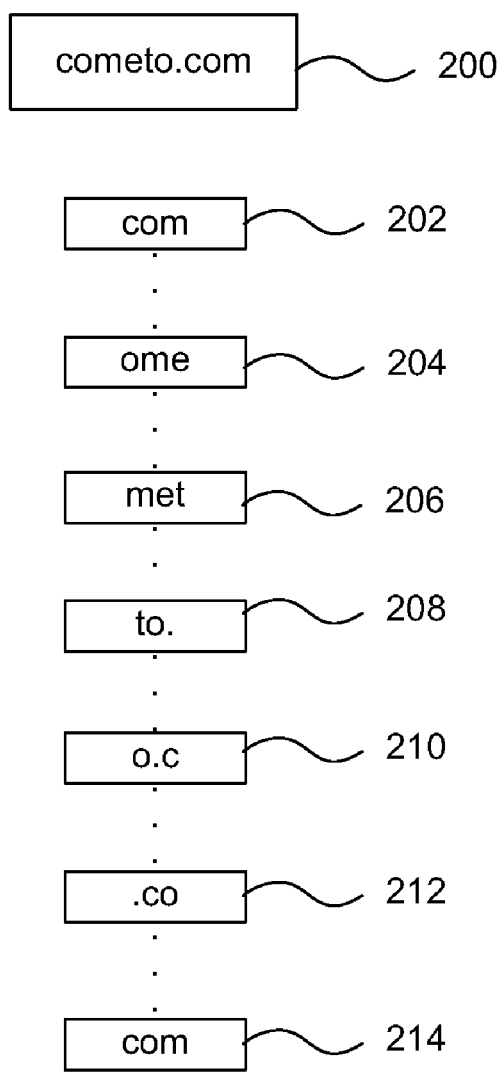
FIG. 2 illustrates exemplary character-based n-grams derived from a domain name 200 according to one embodiment.

FIG. 2 illustrates exemplary character-based n-grams derived from a domain name 200 according to one embodiment. Domain name 200 corresponds to the string "cometo.com." The character-based n-grams derived from the domain name 200 can vary according to the number of characters specified for the character-based n-grams. In one example, the number of characters defined in an n-gram can be three and therefore three-grams are derived. As such, character-based n-gram 202 corresponds to the first three characters of "cometo.com", that is "com". Character-based n-gram 204 corresponds to the second, third and fourth character of the domain name 200, in other words "ome". Furthermore, character-based n-gram 206 corresponds to the next three characters which correspond to the three-gram "met", and so on. Character-based n-grams 208, 210, 212, and 214 are the remaining character-based n-grams that are or can be similarly derived from the string "cometo.com." Using these character-based n-grams the domain name "cometo.com" can be classified according to the methods described herein.

Figure 3A:
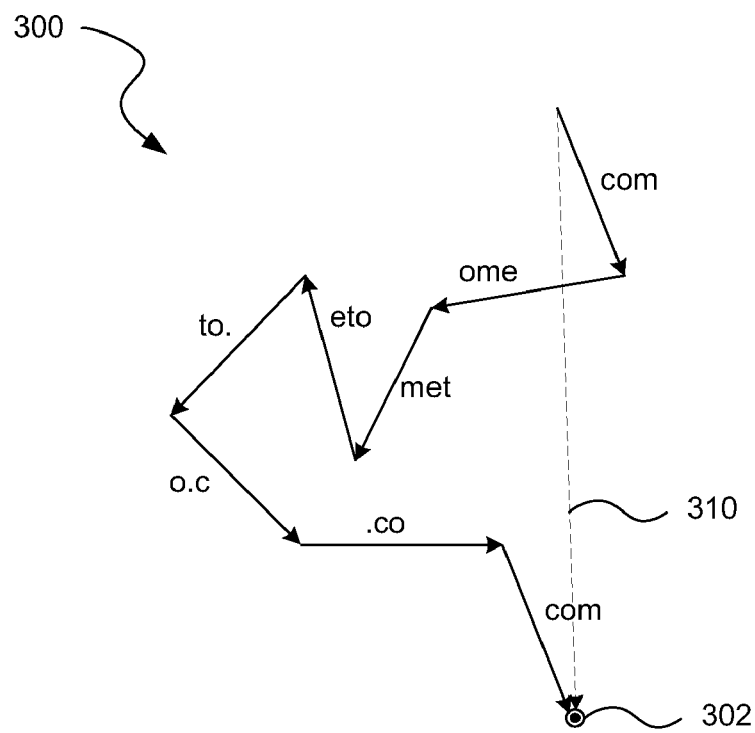
FIGS. 3A-3B illustrate vector mappings of a domain name in a multidimensional space according to some embodiments.

FIG. 3A illustrates the vector mapping of a domain name 200 in a multidimensional space according to one embodiment. As previously discussed, the domain name 200 can be utilized to derive one or more character-based n-grams that can then be used to map a vector point in a multidimensional space. Each of the character-based n-grams in the domain name can define a dimension in the multidimensional space. For example, in FIG. 3A each arrow represents a vector in a dimension corresponding to one character-based n-gram. Therefore, for the domain name "cometo.com" the first character-based n-gram which is "com" would necessarily require a first vector in the first dimension corresponding to the character-based n-gram "com". Once that is mapped, the second vector corresponding to the character-based n-gram "ome" is mapped in the dimension for character-based n-gram "ome". The second vector can be mapped with the initial point being the vector point of the first vector. A third vector in the dimension corresponding to the next character-based n-gram "met" is mapped at with an initial point being the vector point of the second vector, and so on. Thus, each of the character-based n-grams can be used, one after another, to map a domain name vector point. As such, vectors corresponding to eto, to., o.c, .co and corn are consecutive vectors that can be mapped to arrive to a specific vector point 302 in the multidimensional space. Vector point 302 in the multidimensional space can correspond to the domain name "cometo.com" in the multidimensional space.

In one embodiment, each vector can be mapped with an arbitrary magnitude, as long as all vectors are consistently mapped with the same dimension. In another embodiment, each character-based n-gram can be represented by a single unit of a vector magnitude that displaces in one dimension. In one example, the character-based n-gram corn initially displaces one unit in one dimension. The character-based n-gram "ome" displaces yet another unit in another dimension. Finally, the last character-based n-gram corn displaces yet another unit in the same dimension of the first character-based n-gram since both the first and the last character-based n-gram in the same dimension—that is the dimension corresponding to "com." Accordingly, the vector for the first and the last character-based three-grams of the domain name "cometo.com" would be displaced in the same dimension.

Figure 3B:
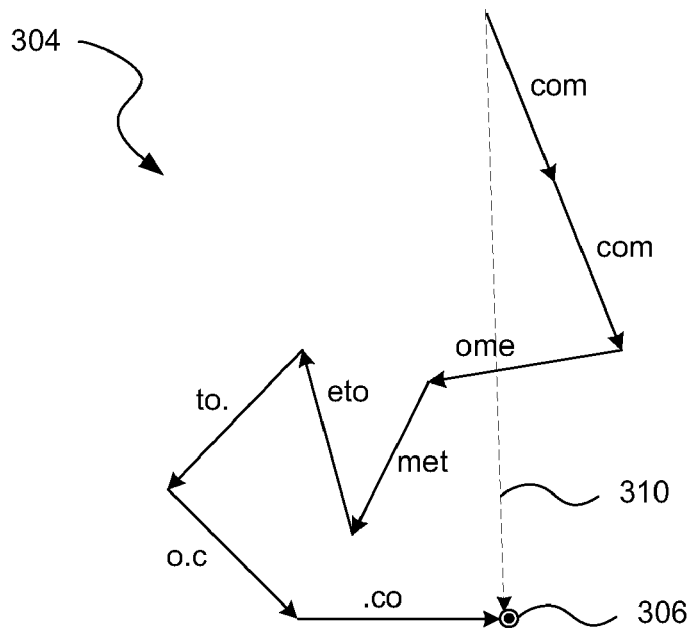

FIG. 3B illustrates the vector mapping of the domain name 200 in a multidimensional space according to another embodiment. FIG. 3B illustrates two units of a vector being displaced in the same dimension corresponding to the character-based n-gram corm. Accordingly, once the mapping for each dimension is carried out, the domain name vector point in space is the same as vector point 302 that was arrived to in FIG. 3A. Therefore, domain name vector point 306 illustrated in FIG. 3B would have the same direction and magnitude as the domain name vector point 302 illustrated in FIG. 3A. In other embodiments, where other character-based n-grams repeat in a domain name, additional vectors can be added in the same dimension. The number of occurrences of the same character-based n-gram in a domain name advances a vector in the same dimension based on that number of occurrences. The vector 310 as illustrated in FIGS. 3A and 3B represents the domain name "cometo.com" in the multidimensional space.

Any other domain names can be mapped in a multidimensional space. Therefore, once multiple domain names are mapped to a multidimensional space, the geometrical correlation between these vector points can be calculated so as to determine whether one or more vector points belong to a specific classification.

FIG. 4 illustrates a multidimensional space having various vector points for various domain names according to one embodiment. In one aspect, a computing device can be configured to receive supervised learning on domain names. This can be achieved, by using a list of domain names and classifications. Multiple domain names can be generated and stored in a list that can be utilized in order to be mapped to the multidimensional space. In one example, domain names having similar content in their corresponding websites can be utilized and mapped to the multidimensional space. For example, domain names corresponding to a classification of sports, domain names corresponding to a classification of shopping, domain names corresponding to a classification of adult websites and domain names according to a classification of education can be mapped in multidimensional space and be identified as being associated with the categories for which they were selected. The list of domain names, corresponding n-grams and classifications can be stored in the n-gram data repository 110. Once this pool of domain names is established and calculated in the multidimensional space, any new or additional domain names can be calculated to be in the multidimensional space. Furthermore, a correlation between the vector point of the new domain name and the corresponding vector points of the previously listed domain names can be calculated.

The size of the multidimensional space will be directly proportional to the number of characters or the size of the character-based n-gram. For example, values for the n in the character-based n-gram can be two, three, four, five, etc. However, the higher the number of values for the n the larger the multidimensional space will be and therefore the more difficult or complex the calculations of correlating vectors in a multidimensional space will become.

Domain name character-based n-grams can have any one of 38 possible characters—ten for characters 0 to 9, twenty-six for characters a-z, the dash symbol and the dot symbol. Furthermore, in character-based one-grams, each character represents a dimension. The number of dimensions or size of the space is defined by 38 n; where n=1 for character-based one-grams. Thus, $38^1$ yields 38 dimensions. In character-based bigrams, two characters represent a dimension. Here n=2 for character-based bigrams. Thus, $38^2$ yields 1444 dimensions. In character-based three-grams, three characters represent a dimension. Here n=3 for character-based three-grams. Thus, $38^3$ yields 54,872 dimensions. In character-based four-grams, four characters represent a dimension. Here n=4 for character-based four-grams. Thus, $38^4$ yields 2,085,136 dimensions.

Accordingly, the character-based n-grams determine the size of the multidimensional space where each character-based n-gram is an axis (dimension) in the high dimensional space. Each domain is the representation of a vector point in the multidimensional space.

In one example, only non-zero character n-grams are used in mapping a domain name to the multidimensional space. As previously mentioned, domain names can have any one of 54,872 possible three-grams. Thus, for a domain name "cometo.com" the three-gram "com" appears twice, the three-grams "ome", "met", "eto", "to.", "o.c", ".co" appear once in the 54,872 combination space. All other three-grams, such as "aaa", "aab", "aac", and the like, appear zero times. As such, in one example, these three-grams can be ignored and therefore not utilized in calculating the domain name vector point.

Once the domain name is plotted to a vector point in the multidimensional space, geometrical methods using the distance between the plotted domain name vector point and the various other domain name vector points previous plotted can be implemented in order to determine whether the domain name vector point falls in a given classification. For example, various methods can be utilized in order to calculate whether the vector point 306 falls under one or more classifications. In one example, vector points 408, 410, 412, and 416 correspond to a first classification while vector points 402, 404, and 406 correspond to a second classification. These classifications can be established initially by an administrator, or a computer process that analyzes at the different character-based n-grams of pre-established domain names. In one example, an administrator of the system can indicate that domain names corresponding to vector points 408, 410, 412, and 416 fall under the first classification. The domain name can then be analyzed as to whether it is in the same classification of vector points 408, 410, 412, and 416.

Various methods of determining the relationship between a domain name vector point and a plurality of domain name vector points can be utilized. In one example, a clustering method is utilized. Each cluster can be a set of domain name vector points that are similar in their classification. In one example, each cluster of vector points is defined by proximity or similarity of vector points.

In yet another example, a K-nearest algorithm is utilized. As it is known in the art, the k-nearest neighbor algorithm permits a vector points to be classified by a majority vote of its neighboring vector points. The domain name vector point is assigned the classification that is most common amongst its k nearest neighboring vector points. In another example, the distance between all of the domain name vector points previously plotted in the multidimensional space and the domain name vector point corresponding to the new domain name can be utilized in order to determine which vector points are in closer proximity. A k number of vector points that are closest to vector point 306 can be examined and analyzed to determine in the classification of the vector points in the plurality of domain name vector points. Using the classification of vector points near the domain name vector point, the classification of the vector point can be determined. For example, the classification of the majority of the near k vector points can be used. As such, if the distance between vector point 306 and vector points 408, 410, 412, and 416 would all indicate that these vector points are closest in proximity to vector point 306 in comparison with vector points 402, 404, and 406, the classification of vector points 408, 410, 412, and 416 can be determined. Because the classification of all or the majority of vector points 408, 410, 412, and 416 are in a first classification, the domain name vector point can be classified in the first classification.

In another embodiment, the epicenter of the vector points in a specific classification can be utilized. For example, as previously mentioned, if vector points 408, 410, 412, and 416 are classified under a first classification the first epicenter of the first classification can be calculated using known methods of the art. Likewise, a second epicenter for the second classification corresponding to vector points 402, 404, and 406 can be calculated. Then, the distances of domain name vector point 306 and the epicenter of the first classification and domain name 306 in the epicenter of the second domain name classification can be calculated. The epicenter of a plurality of vector points can be calculated using known geometrical methods of vector calculation and would yield an additional vector point that would indicate the average location of all vector points located in the multidimensional space for a specific domain name classification.

In yet another example, a support vector machine (SVM) method is utilized. A support vector machine method permits to input vectors points to the mutlidimensional space. A hyperplane 418 can be defined to be the dividing vector point between the first domain name classification and a second domain name classification. Hyperplane 418 can be established either by an administrator or by using known methods of vector calculation such that once the vector point 306, or a new domain name vector point is determined, it can be easily established where the vector point 306 falls in relation to the hyperplane 418. Therefore, the classification of the domain name vector point 306 can be determined. One skilled in the art will recognize that any of the above methods or any other known or to be known methods within the art can be utilized to determine and classify a domain name vector point. In addition, one skilled in the art will also understand that two, three or any number of classifications can be utilized in a multidimensional space and can correspond to any number of vector points plotted in that multidimensional space.

Figure 5:
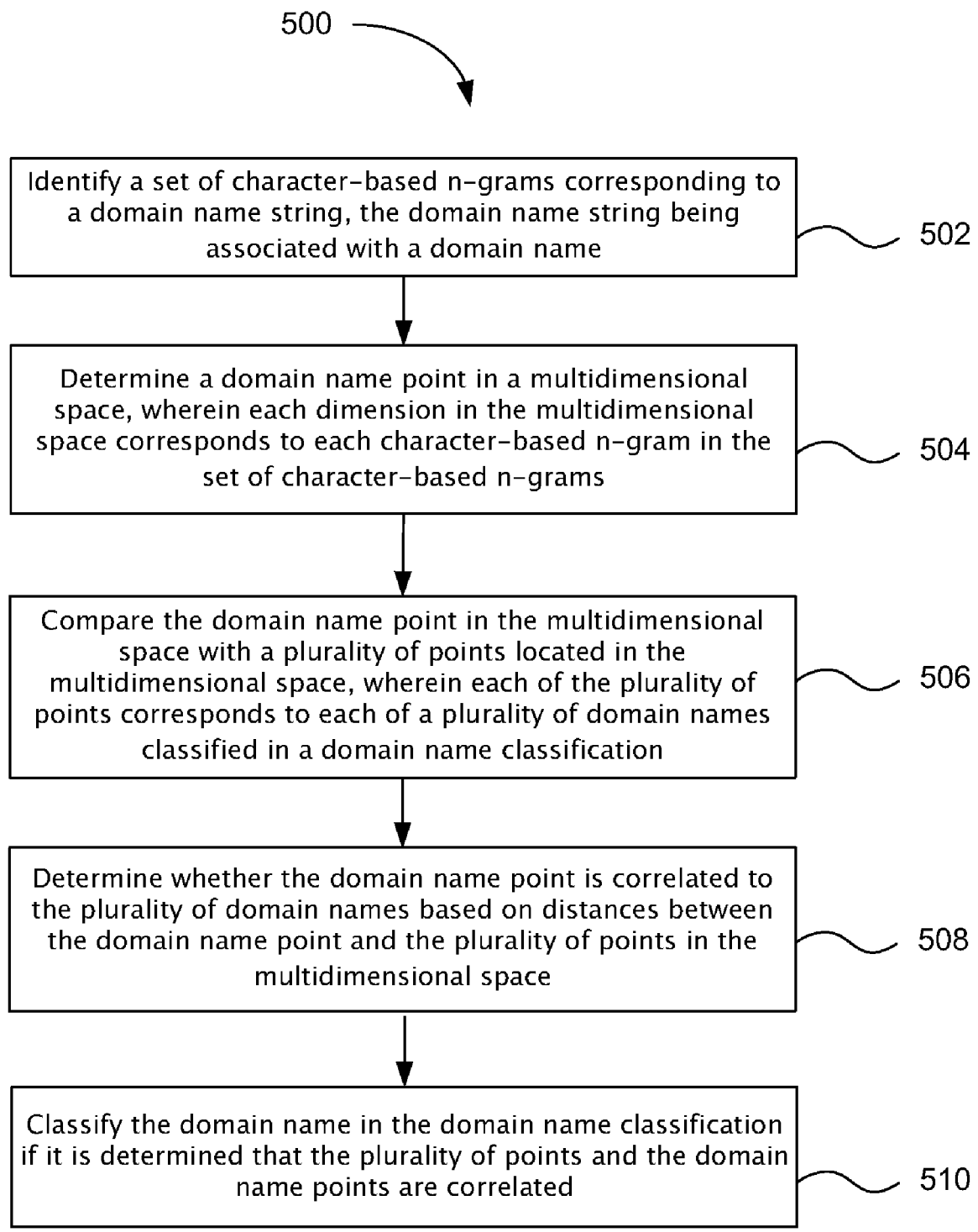
FIG. 5 illustrates a flow diagram of a process for classifying a domain name according to one embodiment.

FIG. 5 illustrates a flow diagram of a process for classifying a domain name according to one embodiment. At process block 502, a set of character-based n-grams corresponding to a domain name string is identified. The domain name string is associated with a domain name. As previously mentioned, a set of character-based n-grams for a domain name string such as "cometo.com" will yield one or more character-based n-grams according to the number of characters in the character-based n-grams. For example, for three-grams the character-based n-grams derived are illustrated in FIG. 2. Process 500 continues at process block 504.

At process block 504, a domain name vector point is determined in a multidimensional space. Each dimension in the multidimensional space corresponds to each character-based n-gram wherein each character-based n-gram is taken from the set of character-based n-grams. In other words, the character-based n-grams derived from the domain name string can be utilized to plot the domain name vector point based on establishing a dimension for each character-based n-gram. Process 500 continues at process block 506.

At process block 506, the domain name vector point in the multidimensional space is compared with a plurality of vector points located in the multidimensional space. Each of the plurality of vector points corresponds to each of a plurality of domain names classified in a domain name classification. As such, one or more domain names can be classified in a domain name classification and plotted as vector points in the multidimensional space according to the methods described herein. In other words, the character-based n-grams for each of the plurality of domain names can be utilized in order to plot a vector point in the multidimensional space corresponding to each of the domain names. Process 500 continues at process block 508.

At process block 508, it is determined whether the domain name vector point is correlated to any of the plurality of domain names based on the distance between the domain name vector point and the plurality of vector points in the multidimensional space. As mentioned above, one or more mechanisms can be utilized to determine whether the domain name vector point is correlated to one or more vector points in the plurality of domain name vector points. Process 500 continues at process block 510.

At process block 510, the domain name is classified in the domain name classification if it is determined that the plurality of vector points and the domain name vector point are correlated.

FIG. 6A illustrates an exemplary table of character-based n-gram in one or more classifications according to one embodiment. The table includes six different character-based n-grams. Each character-based n-gram has a corresponding row that illustrates the occurrences of the n-gram in a given sample number of domain names for each classification. As such, character-based n-gram 614 corresponding to "adu" can be related to three different classifications and have three different occurrences. For example, in the first classification the three gram 614 "adu" appears 21 times in 400 domain names classified under the first classification. Likewise, the three gram 614 "adu" appears ten times in 700 domain names corresponding to a second classification. Finally, character-based n-gram three 614 "adu" appears 85 times in 500 sampled domain names related to a third classification. These calculations or data can be derived easily by deriving character-based n-grams of each of the domain names in each of the classifications in preparing a table similar to table 600. Other character-based n-grams such as character-based n-gram 616, 618, 620, 622, and 624 can each have the occurrence in each of the classifications relative to the number of domain name samples in each classification. For example, the character-based n-gram "xxx" 620 is shown to appear 18 times in a first classification having 400 domain name samples. Further, in a second classification, deemed to be an adult website classification, it shows that 650 websites out of 700 websites include the character-based n-gram 620 "xxx". Finally, a third classification responding to non-adults classification includes only three domain names out of 500 domain names with a third classification that have the character-based n-gram "xxx" as part of the domain name. Based on theses frequencies, the n-gram has a high frequency of appearance in adult websites. If the appearances of the n-gram "xxx" in other websites, the relative frequency of the n-gram "xxx" in the second classification is much higher. Therefore, a domain name having the 3-gram "xxx" is more likely to fall under the adult classification. Thus, the character-based n-grams derived from a new domain name can be utilized to map to this frequency and estimate whether the new domain name falls under one or more of these classifications.

FIG. 6B illustrates an exemplary table of occurrences for character-based n-grams of FIG. 6A according to one embodiment. For example, table 630 shows the three-gram 614 having a first classification ratio of 0.0525 which is the result of dividing 21 over 400 as illustrated in FIG. 6A. Likewise, the three gram 620 for a second classification shows 0.923 which is the result of dividing 650 by 700 for the character-based n-gram 620 "xxx".

FIG. 7 illustrates an exemplary table of relative frequencies of character-based n-grams according to one embodiment. The character-based n-grams in the table can correspond to all of the character-based n-grams of the dictionary set illustrated in FIGS. 6A and 6B.

In one embodiment, the relative frequencies of all of these character-based n-grams can be calculated in a second table 700. The relative frequencies can be derived using Bayesian calculations as it is known in the art. The relative frequencies are indicative of the frequency with which a given n-gram occurs in a domain name of a classification relative to the frequency with which the same n-gram occurs in a domain name of another classification. This relative frequency can be used as a predictor of the classification of n-grams, and therefore of domain names. As such, the relative frequencies in table 700 can be used as probability values indicative of the likelihood that a domain name having a given n-gram is in a classification.

Table 700 is derived from Table 630 according to Bayesian formula that normalizes each of the data elements of a character-based n-gram. In order to do so, the total value of the data for a specific character-based n-gram is added and is utilized as the denominator for each of the values in the various classifications for a character-based n-gram. For example, for character-based n-gram 614, the first value for the first classification 0.525 is added to the second value of the second classification of 0.0143 and is further added to the third value of the third classification 0.17. This yields a result of 0.2368. As such, this value can be utilized to divide each of the values for the first, second and third classifications for character-based n-gram "adu". Therefore, in table 700, 22.17 percent is a result of dividing 0.0525 by 0.2368. Similarly, the second value 6.03 percent is the result of dividing 0.0143 by 0.2368 and finally the third value of 71.79 percent shows the result of dividing 0.17 by 0.2368 of the third classification. As such, the three-gram 614 shows that according to table 700, "adu" will appear with 22 percent of probabilities in the first classification, six percent probabilities in the second classification and 71 percent of probabilities in the third classification. Likewise, a character-based n-gram of "xxx" is deemed to be found 4.6 percent in the first classification, 24 percent in the second classification and 0.6 percent in the third classification. All of the other percentages corresponding to all of the character-based n-grams in table 700 can be utilized to determine the probabilities of a specific character-based n-gram to be in one or the other classification. Therefore, once a domain name is received and broken into multiple character-based n-grams, the multiple character-based n-grams can be mapped to various character-based n-grams in the dictionary set and determine whether the character-based n-gram is under a first, second or third classification or any other classifications included in the specific table of the specific implementation. For example, for a domain name that includes one character-based n-gram that is "xxx", the domain name can be deemed to be in the second classification because the domain name includes the character-based n-gram "xxx" which has a 94.76 percent probability that the domain name is in the second classification. Likewise, if a domain name includes the character-based n-gram "com" the domain name will have a likelihood of being in the first classification by 35.47 percent, in the second classification by 34.55 percent and in the third classification by 29.86 percent. Therefore, it would be more difficult to determine whether the domain name is in one of the three classifications because the likelihood of the character-based n-gram being in any of these classifications is very similar. Furthermore, a threshold value can be established to calculate whether a domain name is under a specific classification or not. In one example, the threshold can be 75 percent. In another example, the threshold can be 80 percent. In another example, the threshold value can be 60 percent. Thus, if the probability value is above 60 percent the domain name including such character-based n-gram can be deemed to be in such classification. The character-based n-gram "dul" 616 as shown in table 700 would likely be in the first classification because it has a 60.3 percent probability that it is in the first classification. Likewise, with a threshold of 60 percent, the character-based n-gram 614 "adu" would indicate that a domain name including such character-based n-gram is in the third classification. Likewise, any domain name including the character-based n-gram "ult" can be deemed to be in the first classification.

In one embodiment, if one character-based n-gram of the domain name indicates that the domain name should be in one classification and a different character-based n-gram indicates that the domain name should be in a different classification a tiebreaker character-based n-gram can be utilized in order to determine which classification the domain name should fall under. In another embodiment, if the character-based n-grams within a domain name indicate different classifications the domain name can simply be deemed to be in both classifications. Various methods of determining which classification and what thresholds should be set can be implemented as one skilled in the art will understand.

Table 700 can be generated in real-time or pre-generated. In one embodiment, the probabilities of the character-based n-grams that result from deriving character-based n-grams from a domain name are calculated in real time. In another example, table 700 can be previously populated and have the probabilities of each of the character-based n-grams in the dictionary set already calculated.

Figure 8:
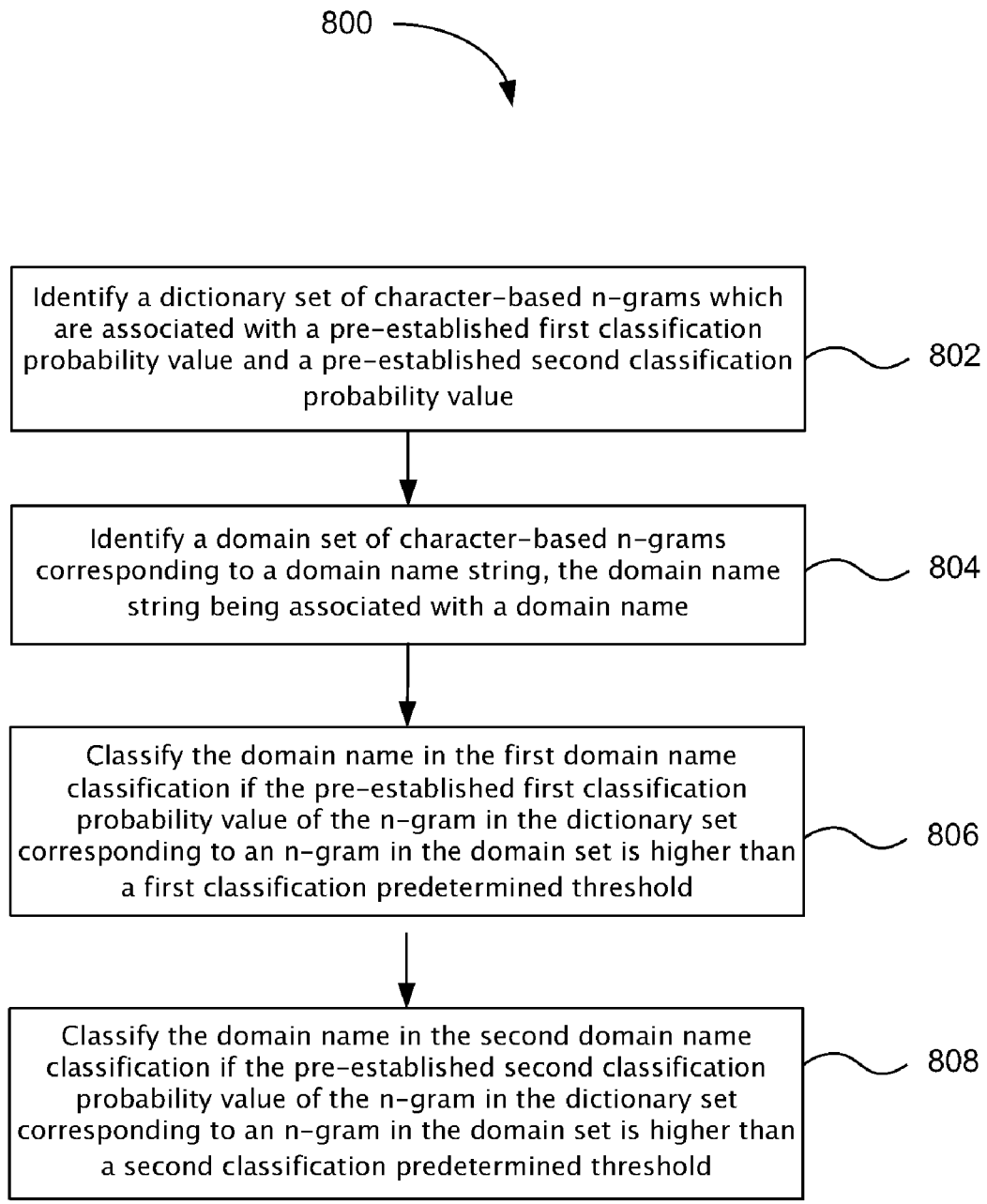
FIG. 8 illustrates a flow diagram of a process for classifying a domain name according to another embodiment.

FIG. 8 illustrates a flow diagram of a process for classifying a domain name according to another embodiment. At process block 802, a dictionary set of character-based n-grams associated with a pre-established first classification probability value, and a pre-established second classification probability value is identified. Process 800 continues at process block 804.

At process block 804, a domain name set of character-based n-grams corresponding to a domain name string is identified. The domain name string can be associated with a domain name. As previously mentioned, this procedure of identifying one or more character-based n-grams in a domain name can be established and determined based on the number of characters in the character-based n-gram as illustrated in FIG. 2. Process 800 continues at process block 806.

At process block 806 the domain name can be classified in the first domain name classification if the pre-established first classification probability value of the character-based n-gram in the dictionary set is higher than a first classification predetermined threshold. Process 800 continues at process block 808.

At process block 808, the domain name in the second domain name classification is classified in the domain name second classification if the pre-established second classification probability value of the character-based n-gram in the dictionary set corresponding to the selected character-based n-gram in the domain set is higher than the second classification predetermined threshold.

Figure 9:
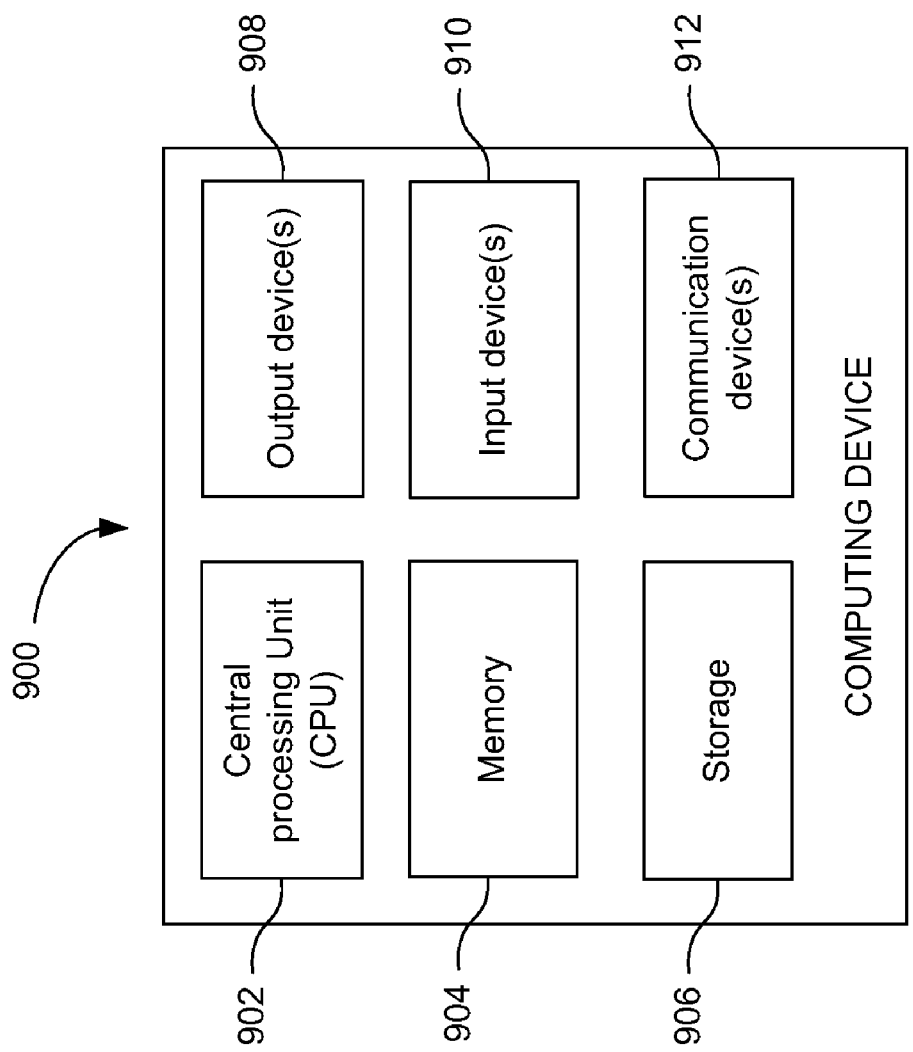
FIG. 9 illustrates a component diagram of a computing device according to one embodiment.

FIG. 9 illustrates a component diagram of a computing device according to one embodiment. The computing device 900 can be utilized to implement one or more computing devices, computer processes, or software modules described herein. In one example, the computing device 900 can be utilized to process calculations, execute instructions, receive and transmit digital signals. In another example, the computing device 900 can be utilized to process calculations, execute instructions, receive and transmit digital signals, receive and transmit search queries, and hypertext, as required by the configuration module 102, the mapping module 104, and the classification module 106.

The computing device 900 can be any general or special purpose computer now known or to become known capable of performing the steps and/or performing the functions described herein, either in software, hardware, firmware, or a combination thereof.

In its most basic configuration, computing device 900 typically includes at least one central processing unit (CPU) 902 and memory 904. Depending on the exact configuration and type of computing device, memory 904 may be volatile (such as RAM), non-volatile (such as ROM, flash memory, etc.) or some combination of the two. Additionally, computing device 900 may also have additional features/functionality. For example, computing device 900 may include multiple CPU's. The described methods may be executed in any manner by any processing unit in computing device 900. For example, the described process may be executed by both multiple CPU's in parallel.

Computing device 900 may also include additional storage (removable and/or non-removable) including, but not limited to, magnetic or optical disks or tape. Such additional storage is illustrated in FIG. 9 by storage 206. Computer storage media includes volatile and nonvolatile, removable and non-removable media implemented in any method or technology for storage of information such as computer readable instructions, data structures, program modules or other data. Memory 904 and storage 906 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 900. Any such computer storage media may be part of computing device 900.

Computing device 900 may also contain communications device(s) 912 that allow the device to communicate with other devices. Communications device(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 900 may also have input device(s) 910 such as keyboard, mouse, pen, voice input device, touch input device, etc. Output device(s) 908 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of classifying a domain name, comprising:
    identifying a dictionary set of character-based n-grams, wherein each character-based n-gram in the dictionary set of character-based n-grams is associated with a pre-established first classification probability value and a pre-established second classification probability value, wherein the pre-established first classification probability value is indicative of whether a corresponding character-based n-gram of the dictionary set is likely to be in a first domain name category, wherein the pre-established second classification probability value is indicative of whether the corresponding character-based n-gram of the dictionary set is likely to be in a second domain name category;
    identifying a domain set of character-based n-grams corresponding to a domain name string, the domain name string being associated with a domain name;
    classifying the domain name in the first domain name category in response to at least one of the pre-established first classification probability value of a first character-based n-gram in the dictionary set corresponding to a first selected character-based n-gram in the domain set or the pre-established first classification probability value of a second character-based n-gram in the dictionary set corresponding to a second selected character-based n-gram in the domain set being higher than a first classification predetermined threshold; and
    classifying the domain name in the second domain name category in response to at least one of the pre-established second classification probability value of the first character-based n-gram in the dictionary set corresponding to the first selected character-based n-gram in the domain set or the pre-established second classification probability value of the second character-based n-gram in the dictionary set corresponding to the second selected character-based n-gram in the domain set being higher than a second classification predetermined threshold.

2. The method of claim 1, further comprising receiving the domain name string as input for classification.

3. The method of claim 1, wherein the character-based n-grams are bigrams, trigrams, or four-grams.

4. The method of claim 1, wherein the first domain name category includes domain names corresponding to non-adult websites, and the second domain name category includes domain names corresponding to adult websites.

5. The method of claim 1, wherein the pre-established first classification probability value is determined with a Bayesian formula that uses a number of occurrences of a character-based n-gram and the number of domain name samples in the first domain name category.

6. The method of claim 5, wherein the pre-established second classification probability value is determined with a Bayesian formula that uses a number of occurrences of a character-based n-gram and the number of domain name samples in the second domain name category.

7. A system of classifying a domain name, comprising:
    a configuration module that identifies a dictionary set of character-based n-grams, wherein each character-based n-gram in the dictionary set of character-based n-grams is associated with a pre-established first classification probability value and a pre-established second classification probability value, wherein the pre-established first classification probability value is indicative of whether a corresponding character-based n-gram of the dictionary set is likely to be in a first domain name category, wherein the pre-established second classification probability value is indicative of whether the corresponding character-based n-gram of the dictionary set is likely to be in a second domain name category;

mapping module that identifies a domain set of character-based n-grams corresponding to a domain name string, the domain name string being associated with a domain name; and a classification module that classifies the domain name in the first domain name category in response to at least one of the pre-established first classification probability value of a first character-based n-gram in the dictionary set corresponding to a first selected character-based n-gram in the domain set or the pre-established first classification probability value of a second character-based n-gram in the dictionary set corresponding to a second selected character-based n-gram in the domain set being higher than a first classification predetermined threshold and that further classifies the domain name in the second domain name category in response to at least one of the pre-established second classification probability value of the first character-based n-gram in the dictionary set corresponding to the first selected character-based n-gram in the domain set or the pre-established second classification probability value of the second character-based n-gram in the dictionary set corresponding to the second selected character-based n-gram in the domain set being higher than a second classification predetermined threshold.

8. The system of claim 7, wherein the classification module is configured to receive the domain name string as input for classification.

9. The system of claim 7, wherein the character-based n-grams are bigrams, trigrams, or four-grams.

10. The system of claim 7, wherein the first domain name category includes domain names corresponding to non-adult websites, and the second domain name category includes domain names corresponding to adult websites.

11. The system of claim 7, wherein the configuration module is configured to determine the pre-established first classification probability value with a Bayesian formula that uses a number of occurrences of a character-based n-gram and the number of domain name samples in the first domain name category.

12. The system of claim 11, wherein the configuration module is configured to determine the pre-established second classification probability value with a Bayesian formula that uses a number of occurrences of a character-based n-gram and the number of domain name samples in the second domain name category.

13. A computer program product comprising a computer storage medium having computer program logic stored thereon for enabling a processor-based system to classify a domain name, the computer program product comprising:

a first program logic module for enabling the processor-based system to identify a dictionary set of character-based n-grams, wherein each character-based n-gram in the dictionary set of character-based n-grams is associated with a pre-established first classification probability value and a pre-established second classification probability value, wherein the pre-established first classification probability value is indicative of whether a corresponding character-based n-gram of the dictionary set is likely to be in a first domain name category, wherein the pre-established second classification probability value is indicative of whether the corresponding character-based n-gram of the dictionary set is likely to be in a second domain name category;

a second program logic module for enabling the processor-based system to identify a domain set of character-based n-grams corresponding to a domain name string, the domain name string being associated with a domain name;

a third program logic module for enabling the processor-based system to classify the domain name in the first domain name category in response to at least one of the pre-established first classification probability value of a first character-based n-gram in the dictionary set corresponding to a first selected character-based n-gram in the domain set or the pre-established first classification probability value of a second character-based n-gram in the dictionary set corresponding to a second selected character-based n-gram in the domain set being higher than a first classification predetermined threshold and for enabling the processor-based system to further classify the domain name in the second domain name category in response to at least one of the pre-established second classification probability value of the first character-based n-gram in the dictionary set corresponding to the first selected character-based n-gram in the domain set or the pre-established second classification probability value of the second character-based n-gram in the dictionary set corresponding to the second selected character-based n-gram in the domain set being higher than a second classification predetermined threshold.

14. The computer program product of claim 13, wherein the second program logic module is for enabling the processor-based system to identify the domain set of character-based n-grams corresponding to the domain name string which is received as input for classification.

15. The computer program product of claim 13, wherein the character-based n-grams are bigrams, trigrams, or four-grams.

16. The computer program product of claim 13, wherein the first domain name category includes domain names corresponding to non-adult websites, and the second domain name category includes domain names corresponding to adult websites.

17. The computer program product of claim 13, further comprising:

a fourth program logic module for enabling the processor-based system to determine the pre-established first classification probability value with a Bayesian formula that uses a number of occurrences of a character-based n-gram and the number of domain name samples in the first domain name category.

18. The computer program product of claim 17, wherein the fourth program logic module includes logic for enabling the processor-based system to determine the pre-established second classification probability value with a Bayesian formula that uses a number of occurrences of a character-based n-gram and the number of domain name samples in the second domain name category.

* * * * *